(12) United States Patent
Johnson et al.

(10) Patent No.: US 12,499,305 B2
(45) Date of Patent: Dec. 16, 2025

(54) COMPOSITIONS RENDERING FOR PUBLISHER-RENDERED NATIVE CONTENT ITEMS IN APPLICATIONS

(71) Applicant: Google LLC, Mountain View, CA (US)

(72) Inventors: Spencer S. Johnson, Morgan Hill, CA (US); Calvin Cheng, Mountain View, CA (US); David Francis Pomeroy, San Francisco, CA (US); Yucheng Wang, Mountain View, CA (US); Ranmin Chen, Milpitas, CA (US); Alexander Mermelstein, Campbell, CA (US); Lingxing Yuan, Mountain View, CA (US); Sara Christine Adkins, San Jose, CA (US); An-Tai Li, Mountain View, CA (US); Wenchao Tong, Saratoga, CA (US); Priscilla Pun, New York, NY (US); Brendan Khoi Luu, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 245 days.

(21) Appl. No.: 18/296,059

(22) Filed: Apr. 5, 2023

(65) Prior Publication Data
US 2024/0338515 A1    Oct. 10, 2024

(51) Int. Cl.
G06F 40/143    (2020.01)

(52) U.S. Cl.
CPC .................. G06F 40/143 (2020.01)

(58) Field of Classification Search
CPC .......... G06F 17/00; G06F 3/00; G06F 3/0481; G06F 3/14; G06F 15/16; G06F 3/048;
(Continued)

(56) References Cited

U.S. PATENT DOCUMENTS 8,843,847 B1 *   9/2014   Boyle ..................... G06F 9/451
                                                            709/219
9,164,966 B1 *  10/2015   Llach .................... G06F 40/103
(Continued)

FOREIGN PATENT DOCUMENTS

CN           114862470 A         8/2022

OTHER PUBLICATIONS

International Search Report and Written Opinion for Application No. PCT/US2024/022621, mailed Jun. 13, 2024, 12 pages.
(Continued)

*Primary Examiner* — Rayeez R Chowdhury
(74) *Attorney, Agent, or Firm* — DORITY & MANNING P.A.

(57) ABSTRACT

Example embodiments of the present disclosure provide for an example method including obtaining a request for third party content elements to be used in a publisher-rendered native content item slot. The example method includes obtaining input signals comprising data indicative of publisher-rendered native content items. The example method includes generating, by a model associated with the content provider computing system, based on the input signals, an expected native content item slot size. The example method includes obtaining, by the content provider computing system, content item elements from a content provider. The example method includes generating based on the expected native content item slot size, a replacement main asset comprising a first content element of the one or more content elements. The example method includes transmitting data including the replacement main asset and additional content elements to a publisher to be used in a publisher-rendered native content item slot.

17 Claims, 7 Drawing Sheets

(58) Field of Classification Search
CPC ........ G06F 16/958; G06F 3/01; G06F 3/0484;
G06F 3/16; G06F 13/00; G06F 15/00;
G06F 40/00; G06F 40/134; G06F 40/169
See application file for complete search history.

(56) References Cited

U.S. PATENT DOCUMENTS

| | | |
|---|---|---|
| 10,423,674 B1* | 9/2019 | Burriesci .............. H04L 67/535 |
| 10,917,494 B2 | 2/2021 | Dukellis et al. |
| 11,080,755 B1 | 8/2021 | Logvinskiy et al. |
| 2012/0209708 A1 | 8/2012 | Ramer et al. |
| 2015/0220492 A1* | 8/2015 | Simeonov ............. G06F 16/972 |
| | | 715/244 |
| 2017/0046751 A1* | 2/2017 | Kirillov ............. G06Q 30/0277 |
| 2017/0315972 A1* | 11/2017 | Lampert ............... H04L 67/564 |
| 2018/0191798 A1* | 7/2018 | Zhu ....................... G06F 40/186 |
| 2020/0027118 A1* | 1/2020 | LaMontagne ...... G06Q 30/0242 |
| 2020/0252478 A1* | 8/2020 | Dukellis ............. G06F 16/9014 |
| 2022/0156451 A1* | 5/2022 | Weald ................ G06Q 30/0277 |
| 2022/0286743 A1 | 9/2022 | Jain et al. |

OTHER PUBLICATIONS

International Preliminary Report on Patentability for Application No. PCT/US2024/022621, mailed Oct. 16, 2025, 8 pages.

* cited by examiner

COMPOSITIONS RENDERING FOR PUBLISHER-RENDERED NATIVE CONTENT ITEMS IN APPLICATIONS

FIELD

The present disclosure relates generally to generation and delivery of publisher-rendered native content items.

BACKGROUND

A client device can request data from a server. The data can include instructions for rendering content corresponding to data for display via an interface of an application of the client device. A content publisher associated with the application can generate data comprising instructions associated with presentation parameters of the content item (e.g., a native content item).

SUMMARY

Aspects and advantages of embodiments of the present disclosure will be set forth in part in the following description, or can be learned from the description, or can be learned through practice of the embodiments.

In an example aspect, the present disclosure provides for an example computer-implemented method. The example method includes obtaining, from a client device, by a content provider computing system, a request for a plurality of content elements to be utilized in a publisher-rendered native content item slot. The example method includes obtaining, by the content provider computing system, input signals comprising data indicative of one or more publisher-rendered native content items. The example method includes generating, by a model associated with the content provider computing system, based on the input signals, an expected native content item slot size. The example method includes obtaining, by the content provider computing system, one or more content item elements from a content provider. The example method includes generating, by the content provider computing system, based on the expected native content item slot size, a replacement main asset comprising a first content element of the one or more content elements. The example method includes transmitting, by the content provider computing system, data comprising the replacement main asset and one or more additional content elements to a publisher to be used in a publisher-rendered native content item slot.

In some embodiments of the example method, the example method includes obtaining, by the content provider computing system, content item data indicative of a publisher-rendered native content item, wherein the content item data can include at least one of a size of a rendered native content item, a layout of the rendered native content item, or an impression associated with the rendered native content item. In some embodiments of the example method, the example method includes updating, by the content provider computing system, the model to predict the expected native content item slot size based on the obtained content item data.

In some embodiments of the example method, the publisher-rendered native content item is provided for display via the publisher-rendered native content item slot via a user interface associated with an application of the publisher.

In some embodiments of the example method, generating the main asset includes obtaining, by a content generation component, the one or more content item elements; determining, by the content generation component, a main content item element; determining, based on the expected native content item slot size and a size of the main content item element, an expected area of negative space around the main content element to reach an entire area associated with the expected native content item slot size; and generating, based on the main content element, replacement main asset comprising the main content element and one or more generated content elements, wherein the replacement main asset satisfies a size threshold or a resolution threshold.

In some embodiments of the example method, the replacement main asset is generated based at least in part on one or more features associated with the publisher, wherein the features comprise at least one of colors, font, style, image, or logo.

In some embodiments of the example method, the replacement main asset can include an HTML5 asset.

In some embodiments of the example method, the model can include a statistical model.

In some embodiments of the example method, the model can include a machine learned model.

In some embodiments of the example method, the expected native content item slot size can include a position, a width, or a height.

In one example aspect, the present disclosure provides for an example system for compositions rendering for publisher-rendered native content items in applications including one or more processors and one or more memory device storing instructions that are executable to cause the one or more processors to perform operations. In some implementations, the one or more memory devices can include one or more transitory or non-transitory computer-readable media storing instructions that are executable to cause the one or more processors to perform operations. In the example system, the operations can include obtaining, from a client device, by a content provider computing system, a request for a plurality of content elements to be utilized in a publisher-rendered native content item slot. In the example system, the operations can include obtaining, by the content provider computing system, input signals comprising data indicative of one or more publisher-rendered native content items. In the example system, the operations can include generating, by a model associated with the content provider computing system, based on the input signals, an expected native content item slot size. In the example system, the operations can include obtaining, by the content provider computing system, one or more content item elements from a content provider. In the example system, the operations can include generating, by the content provider computing system, based on the expected native content item slot size, a replacement main asset comprising a first content element of the one or more content elements. In the example system, the operations can include transmitting, by the content provider computing system, data comprising the replacement main asset and one or more additional content elements to a publisher to be used in a publisher-rendered native content item slot.

In the example system, the publisher-rendered native content item slot is within a publisher application, wherein the publisher application can include a software development kit (SDK) associated with the content provider computing system for generating a request for one or more content elements and rendering the replacement main asset and the one or more additional content elements via the publisher-rendered native content item slot.

In the example system, generating the replacement main asset comprising the first content element of the one or more content elements can include generating, using a generative model, the replacement main asset.

In the example system, the replacement main asset can include a full-screen main asset.

In the example system, generating the replacement main asset comprising the first content element of the one or more content elements can include determining one or more safe zones within a publisher-rendered native content item with dimensions equal to the expected native content slot size; and populating the one or more safe zones with one or more interactive user interface elements associated with the content elements.

In the example system, the client device can include a walled garden environment, wherein the publisher-rendered native content item slot is inside the walled garden.

In the example system, the publisher-rendered native content item can include one or more interactive user interface elements, the operations can include obtaining interaction data indicative of a user selection of a first interactive user interface element of the one or more interactive user interface elements; generating a first raw data signal comprising the interaction data; and storing the first raw data signal comprising the interaction data.

In the example system, generating the expected native content item slot size can include obtaining, by the content provider computing system, content item data indicative of one or more publisher-rendered native content items, wherein the content item data can include at least one of a size of a rendered native content item, a layout of the rendered native content item, or an impression associated with the rendered native content item; and generating, by the model associated with the content provider computing system, an expected native content item slot size.

In the example system, the operations can include obtaining, by the content provider computing system, content item data indicative of a publisher-rendered native content item, wherein the content item data can include a size of a rendered native content item; comparing the data indicative of the publisher-rendered native content item to an expected native content item slot size; and updating the model associated with the content provider computing system based on comparing the data indicative of the publisher-rendered native content item to the expected native content item slot size.

In the example system, the replacement main asset can include an HTML5 asset, wherein the HTML5 asset can include one or more interactive user interface elements.

In an example aspect, the present disclosure provides for an example transitory or non-transitory computer readable medium embodied in a computer-readable storage device and storing instructions that, when executed by a processor, cause the processor to perform operations. In the example transitory or non-transitory computer readable medium, the operations include obtaining, from a client device, by a content provider computing system, a request for a plurality of content elements to be utilized in a publisher-rendered native content item slot. In the example transitory or non-transitory computer readable medium, the operations include obtaining, by the content provider computing system, input signals comprising data indicative of one or more publisher-rendered native content items. In the example transitory or non-transitory computer readable medium, the operations include generating, by a model associated with the content provider computing system, based on the input signals, an expected native content item slot size. In the example transitory or non-transitory computer readable medium, the operations include obtaining, by the content provider computing system, one or more content item elements from a content provider. In the example transitory or non-transitory computer readable medium, the operations include generating, by the content provider computing system, based on the expected native content item slot size, a replacement main asset comprising a first content element of the one or more content elements. In the example transitory or non-transitory computer readable medium, the operations include transmitting, by the content provider computing system, data comprising the replacement main asset and one or more additional content elements to a publisher to be used in a publisher-rendered native content item slot.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
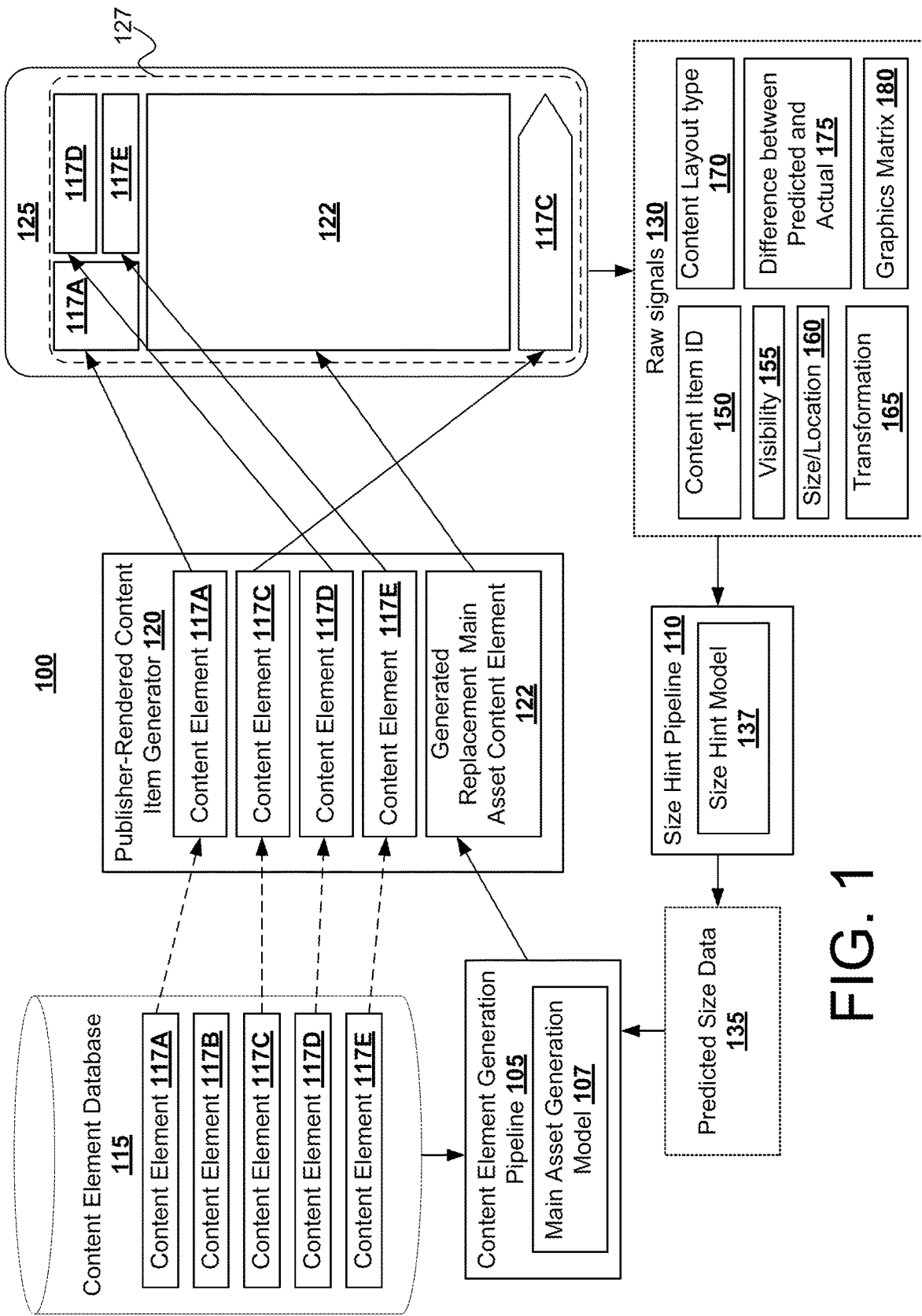
FIG. 1 depicts a flow chart diagram of example data flow according to example embodiments of the present disclosure.

Generally, the present disclosure provides for a new model for predicting the size of a publisher-rendered native content item slot in an application and generating a main asset to transmit to the publisher with additional content elements. For instance, social media applications can include publisher-rendered native content items composed of third-party content elements. The publisher-rendered native content items can render as though they are an integrated portion of a feed of the social media application displayed on a user device. The present disclosure provides for improved utilization of user interface display space by improving the main asset element of the publisher-rendered native content item.

The system can include a size hint pipeline and a content element generation pipeline. The size hint pipeline can obtain raw signals as input. The raw signals can include qualities associated with publisher-rendered native content items. For instance, the publisher-rendered native content items can include one or more native content items previously provided for display via a user interface of a client device. For instance, signals can include a content item ID, visibility, size/location, a difference between a predicted size and an actual size, layout type, or image transformation. The size hint pipeline can predict the size of the publisher-rendered native content item. The size hint pipeline can calculate and validate a predicted size that can be used in a future content item request.

The content element generation pipeline can utilize the predicted size as an input. The content element generation pipeline can generate a replacement main asset based on the signals received and other information associated with a content item request. By way of example, a content provider can maintain a database of a plurality of content elements. The content elements can include icons, images, logos, videos, text, color schemes, or any other content elements. The existing content elements can be obtained as input into the model to generate the replacement main asset.

The generated replacement main asset and additional content elements can be transmitted to a publisher to be transformed into a publisher-rendered native content item. The publisher can generate the native content item and provide the native content item for display. The computing system can obtain data indicative of the characteristics of the native content item and use that data to update or train the size hint model.

The technology of the present disclosure can provide a number of technical effects and benefits. For instance, aspects of the described technology can allow for a reduction in the degradation of image quality of a publisher-rendered native content element by generating the replacement main asset based on a predicted size or aspect ratio of the publisher-rendered native content item slot. Additionally, the present disclosure can provide for improved utilization of user interface display to display more information by generating a replacement main asset that reduces the amount of negative space in the publisher-rendered native content item. The present disclosure can also provide for an improved model for predicting publisher-rendered native content item slots characteristics. The improved model can be continuously trained using a feedback loop that takes into account characteristics of the publisher-rendered native content item in determining the future predictions.

The improvements associated with the systems and methods discussed herein can be further understood with reference to the figures.

FIG. 1 depicts a block diagram of example data flow 100 according to example embodiments of the present disclosure. Data flow 100 can include a content element generation pipeline 105, a size hint pipeline 110, a content element database 115, a publisher-rendered content item generator 120, a client device 125, raw signals 130, and predicted size data 135. In some implementations, data flow 100 can be initiated in response to content provider obtaining a request for a content package (e.g., including a plurality of content elements) to be presented as a publisher-rendered native content item within a publisher application 127 on a client device 125.

Content element generation pipeline 105 can include a main asset generation model 107. Content element generation pipeline 105 can obtain one or more content elements from content element database 115 and the predicted size data 135. Content element generation pipeline 105 can generate a replacement main asset 122 as output. The predicted size data 135 that is generated by size hint model 137 can be utilized by content element generation pipeline 105 as input. Content element generation pipeline 105 can process the input including one or more content elements 117A-117E and generate a replacement main asset 122 to be utilized in a publisher-rendered native content item.

Content element generation pipeline 105 can determine, based on the expected native content item slot size and a size of the main content item element, an expected area of negative space around the main content element to reach an entire area associated with the expected native content item slot size. Content element generation pipeline 105 can generate, based on the main content element, a replacement main asset 122 comprising the main content element and one or more generated content elements. The replacement main asset 122 can satisfy a size threshold or a resolution threshold.

The replacement main asset 122 can be generated based on features associated with the publisher associated with the content item request. For instance, the features can include colors, font, style, an image, or a logo. The replacement main asset 122 can include an HTML5 asset. For instance, an HTML5 asset can include additional information not presently included in main assets utilized in publisher-rendered native content items. For instance, the HTML5 asset can include click tag reporting on individual exits, polite loading, rich media, content items that can expand to a larger size, content with one or more interactive elements, reporting on multiple exits, reporting on multiple counters, reporting on multiple timers, expanding to larger size or full screen, video content, or audio content. In some implementations, content with one or more interactive elements can include content items similar to a carousel or other multiple content-item content (e.g., content that can be scrolled or swiped on).

Figure 4:
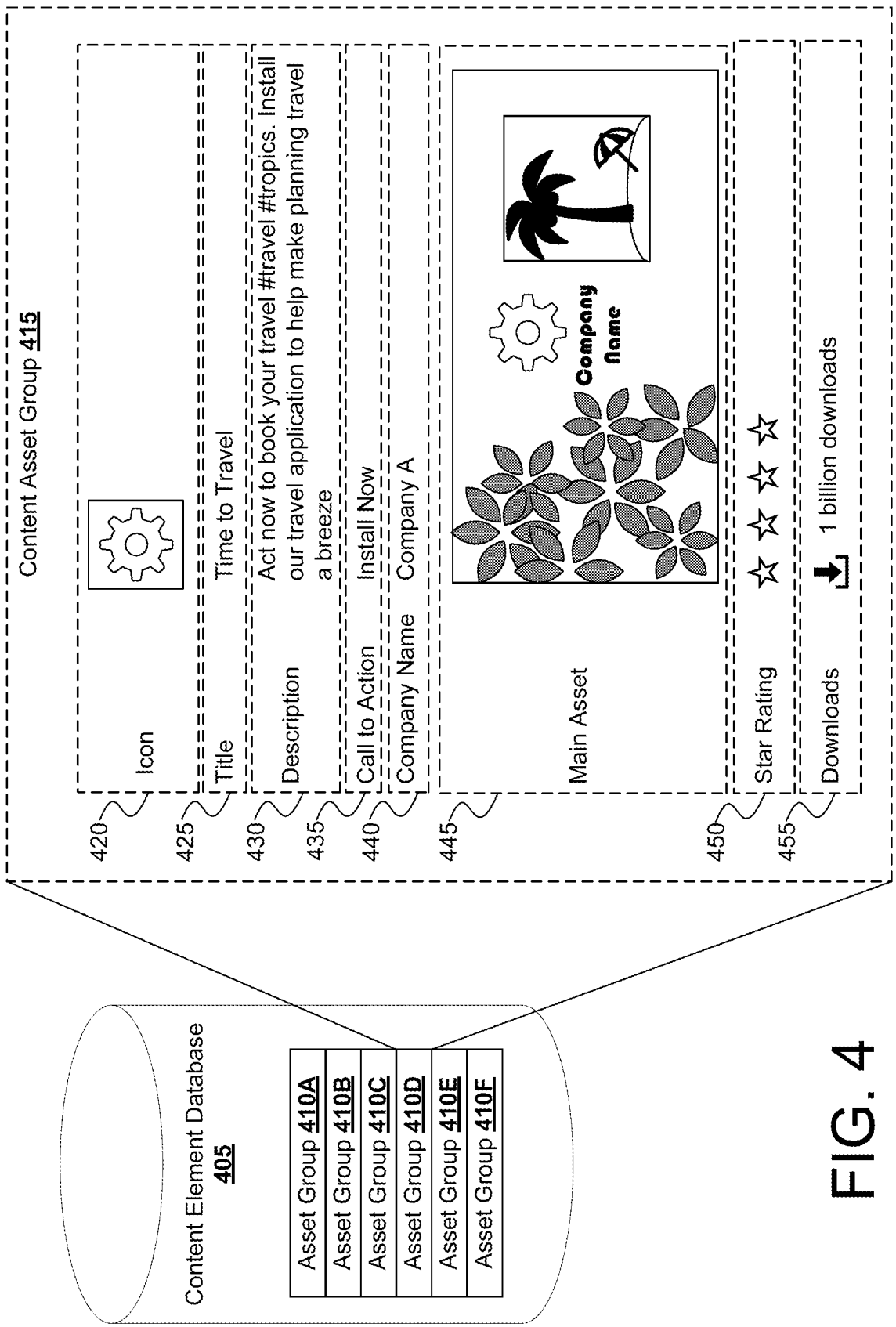
FIG. 4 depicts a block diagram of an example database and data points according to example embodiments of the present disclosure.

Content element database 115 can include a plurality of content elements 117A-117E. Content elements can be utilized by publisher-rendered content item generator 120 or content element generation pipeline 105. Content elements 117A-117E in content element database 115 can be organized into groups. For example, content elements 117A-117E can be organized into asset groups (e.g., as depicted in FIG. 4). Content elements 117A-117E can be any kind of content element. For instance content elements 117A-117E can include icons, company names, ratings, descriptions, images, main images, number of downloads, color schemes, or any other content elements. Content element generation pipeline 105 can obtain, by a content generation component, one or more content item elements. For instance, the one or more content item elements can include generated replacement main asset 122 or one or more content elements 117A-117E.

Publisher-rendered content item generator 120 can obtain a plurality of content item elements from content element database 115. For instance, publisher-rendered content item generator 120 can obtain replacement main asset 122 from content element generation pipeline 105 or content element 117A, content element 117C, content element 117D, or content element 117E from content element database 115. The publisher-rendered content item generator 120 can determine a main content item element. For instance, the main content item element can be replacement main asset 122.

Publisher-rendered content item generator 120 can utilize the obtained replacement main asset 122 and content elements (117A, 117C. 117D, 117E) to generate a publisher-rendered native content item within the publisher application 127 to be presented via a user interface of client device 125. In an implementation, the publisher-rendered native content item can include an icon (e.g., content element 117A), a company name (e.g., content element 117D), a description (e.g., content element 117E), the replacement main asset 122, and a call to action (e.g., content element 117C). The publisher-rendered native content item is provided for display via the publisher-rendered native content item slot via a user interface associated with a publisher application.

Publisher-rendered content generator 120 can be performed on client device 125 (e.g., by the publisher executing in publisher application 127.

A content provider computing system can obtain data from client device 125 or publisher application 127. For instance, content provider computing system can collect raw signals 130 from publisher application 127 executing on client device 125.

Additionally, or alternatively, client device 125 or publisher application 127 can transmit data (e.g., via a software development kit associated with the content provider computing system) comprising raw signals 130 to a content provider computer system. For instance, size hint pipeline 110 can obtain raw signals 130 from client device 125 or publisher application 127 and generate predicted size data 135. Raw signals 130 can include, for example, content item ID 150, visibility 155, size/location 160, transformation type 165, content layout type 170, difference between predicted and actual type 175.

In some instances publisher application 127 can be a walled garden environment. For instance, the publisher-rendered native content item slot can be inside the walled garden. Native content can be beneficial in a walled garden environment due to the control the publisher computing device has over the presenting and interaction with a publisher-rendered native content item.

In some instances, publisher application 127 can include an application downloaded on client device 125. In some instances, publisher application 127 can include a web-based application accessed via client device 125.

Content item ID 150 can include an identifier associated with a particular content element or asset. For instance, in some implementations, individual content item elements can have individual asset IDs. Additionally, or alternatively, groupings of assets can have an ID associated with the group of assets. For instance, a promotional title can be tied to a specific description or main asset. The title, description, and main asset can be associated with a single group asset ID or can be associated with different individual asset IDs.

Visibility 155 can be associated with whether the content item was located within the viewport. For instance, a request can be received for a content item that is expected to be shown to a user. The content item can preload to avoid a delay in rendering the content item via the user interface. In some instances, the publisher application can be closed or a session can be ended before the preloaded content is displayed within the viewport. Thus visibility 155 can be associated with an indication of whether the content item was viewed (e.g., an impression was made).

Size/location 160 can include a location paired with dimensions can include a location (e.g., position) within a user interface (e.g., in cartesian coordinates). The location can be associated with a corner of the content slot. For instance, the location can be associated with a corner of the content. The dimensions can include a height dimension and width dimension.

Transformation type 165 can be associated with how an image or other content element can be transformed to fit within a view. For instance, the transformation type 165 can include a crop, stretch, center, or other modification to the content item. For instance, each transformation type can have subtypes. Center can include centering an image within a view and performing no scaling. Center crop can include scaling an image uniformly (e.g., maintaining the aspect ratio) so that width and height of the image are equal to or larger to the dimension of the view (minus padding). Fit center can include scaling the image using graphic matrix 180.

Content layout type 170 can include information on how a width dimension and height dimension are defined. For instance, the content layout type 170 can include at least one of static, match parent, or wrap content. For instance, static can be an exact number for the width and height that are a set number of pixels, or other measurement. Match parent can be associated with a size that is as large as the parent window (minus padding). Wrap content can be associated with a view that is large enough to enclose content (plus padding). Note that each dimension can have a different content layout type 170. For instance, a width can be a static number while the height dimension can be a match parent type.

Difference between predicted and actual type 175 includes data indicative of the predicted publisher-rendered native content item slot size and the ultimate content item slot size, layout or presented data, or other related information. In some implementations, there can be a difference between the predicted publisher-rendered native content item slot size and the actual native content item that is provided for display. The computing system can compare the native content item slot size and the actual native content item to determine a difference and update the size hint model if needed.

Graphics matrix 180 can include scaling using a matrix when drawing. The transformation matrix can specify acceptable transformations for an image. For instance, transformations can include rotation, scaling (up or down), translation (left or right), inversion, or reflection.

Predicted size data 135 can be associated with a prediction of the content item rendering size. At the time the content item is requested, and the real-time content selection process occurs, the content provider does not know the size of the final content rendering. For instance, many main assets can be originally designed to occupy approximately one third of the viewport of a user interface. Thus, if an expected size of the native content item slot is full screen, it can be advantageous to generate a replacement main asset that can fill more of the viewport (e.g., more than one third of the screen size). For instance, in a social media application that provides a social feed that occupies the entire viewport. By generating the customized replacement main assets for the predicted content size, a reduction in issues caused by poor rendering of the content item can be avoided. Thus, getting accurate predicted size data 135 of the content item is important for generating a replacement main asset for the publisher-rendered native content item.

Size hint pipeline 110 can include a size hint model 137. Size hint model 137 can be configured to obtain the raw signals 130 to calculate predicted size data 135 or validate a predicted size. By way of example, the size hint model 137 can be continuously updated or trained based on newly obtained data. For instance, the newly obtained data can be used in a feedback loop that provides for better predictions of predicted size data 135. The methods for calculating predicted size data 135 or validating predicted size data 135 will be discussed further with regard to FIG. 3, FIG. 5, or FIG. 7.

In some instances, the publisher-rendered native content item includes one or more interactive user interface elements. The computing system can obtain interaction data indicative of a user selection of a first interactive user interface element of the one or more interactive user interface elements. The computing system can generate first raw signal data comprising the interaction data (e.g., impression data, click data, target action performed data). The computing system can store the first raw data signal comprising the interaction data. In some instances, the stored interaction data can be used to update or train the size hint model 137.

For instance, a content provider computing system can obtain content item data indicative of a publisher-rendered native content item. The content item data can include the size of a rendered native content item, a layout of the rendered native content item, or an impression associated with the rendered native content item. The content provider computing system can update size hint model 137 to predict the expected native content item slot size based on the obtained item data.

For instance, the computing system can obtain content item data indicative of one or more publisher-rendered native content items. The content item data can include at least one of a size of a rendered native content item, a layout of the rendered native content item, or an impression associated with the rendered native content item. The computing system can generate, by size hint model 137, an expected native content item slot size.

In some implementations, size hint model 137 can include a statistical model. For instance, size hint model 137 can determine a distribution of sizes. In some implementations, size hint model 137 can determine a 95th percentile size. The 95th percentile can be associated with the largest expected rendering size that avoids outliers. The computing system can utilize the 95th percentile for the predicted size data 135.

In some implementations, size hint model 137 can include a machine-learned model. The machine-learned model can determine predicted size data 135.

In some implementations size hint model 137 can be updated based on a comparison of a predicted size hint and data (e.g., raw signals 130) indicative of the actual layout of publisher-rendered native content item or actual content item slot size. For instance, the computing system can obtain content item data indicative of a publisher-rendered native content item. The content item data comprises a size of a rendered native content item. The computing system can compare the data indicative of the publisher-rendered native content item to an expected native content item slot size. The computing system can update the model associated with the content provider computing system based on comparing the data indicative of the publisher-rendered native content item to the expected native content item slot size.

Figure 2:
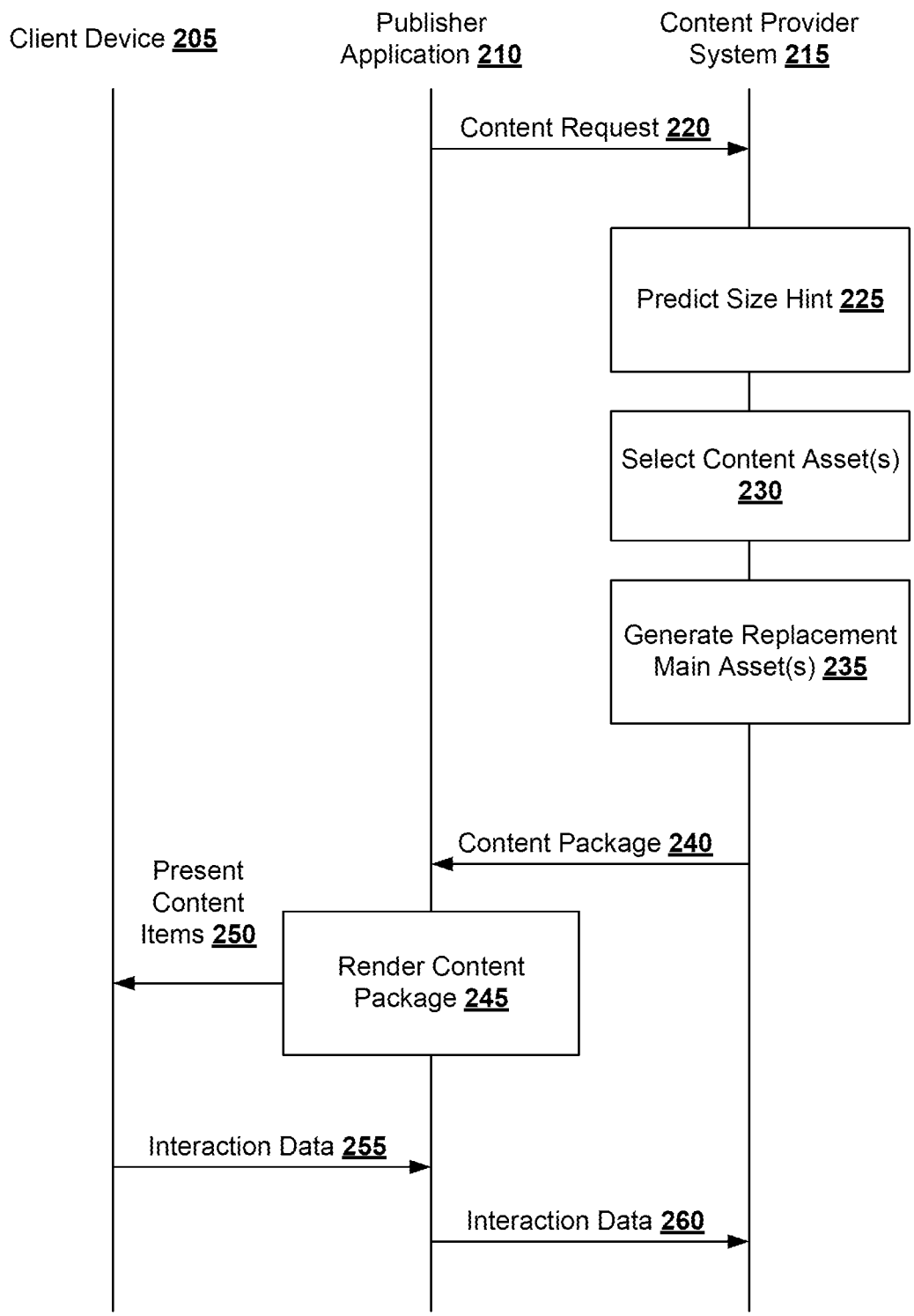
FIG. 2 depicts a swim lane diagram of an example method to perform size hint prediction and main asset generation for publisher-rendered native content items according to example embodiments of the present disclosure.

FIG. 2 depicts a swim lane diagram of an example process for providing a generated replacement main asset based on a predicted size of a content slot in response to obtaining a request for content for a publisher-rendered native content item. For instance, the swim lane diagram can include a client device 205, a publisher application 210, and a content provider system 215. The publisher application can send content request 220 to content provider system 215. The content request 220 can be a request for content assets to be used by the publisher application to generate publisher-rendered native content items. Content provider system 215 can obtain the content request 220 and perform operations in response.

Publisher application 210 can include a software development kit (SDK) associated with content provider system 215. The SDK can be associated with content provider system 215 and can generate a request for one or more content elements and facilitate rendering the replacement main asset and one or more additional content elements via the publisher-rendered native content item slot (e.g., as described in render content package 245 and present content items 250).

In response to obtaining content request 220, content provider system 215 can perform an operation to predicted size 225. Predict size 225 can be performed by a size hint model (e.g., size hint model 137). Size hint model can generate a predicted size based on historical native content item slots. The predicted size that is determined at predict size 225 can be obtained as input into a main asset generation model (e.g., main asset generation model 107).

Content provider system 215 can select content asset(s) 230. In some implementations, content provider system 215 can select one or more generated replacement main assets and associated content elements. By way of example, content provider system 215 can select content asset(s) 230 using a real-time content selection process. As described herein, content asset(s) 230 can include content elements that can be combined by a publisher application to generate a publisher-rendered native content item.

The real-time content selection process can include generating a token for each respective eligible content element type. The content elements can compete in the real-time selection process (e.g., auction). A winning content element (or content asset group) can be selected. Content selection can be based on context associated with the content request 220. This can include the type of application of publisher application 210, context of recently displayed content items, data associated with client device 205, date or time data, or other relevant contextual data.

Content selection can include incorporation of additional or alternative considerations in selecting content. For instance, a content selection component can include participation in a real-time content selection process (e.g., proposals for resource allocation, bids, etc.). Content selection can include selecting one or more digital components or content items. Content items can include, for example input elements, digital components, and the like. For instance, content items can be provided by entities and can be related to a particular topic, object, product, or service.

The content item can be selected using a machine-learned model. For instance, the computing system can obtain data indicative of user interaction with one or more content items, The computing system can obtain data indicative of a user performing one or more target actions. The computing system can update the machine learned model based on the data indicative of the user interaction with the one or more content items and the data indicative of the user performing one or more target actions (e.g., downloading an application, clicking a link) or responding to a call to action.

Main asset generation model can generate one or more replacement main asset(s) 235 for one or more content items. For example, the content provider system 215 can communicate with one or more first party content providers or second party content providers. For instance, content elements can be related to one or more companies. The content elements can be grouped into assets groups that can be selected and transmitted to the publisher application 210.

In some implementations, the computing system can generate the replacement main asset in response to selecting content assets in select content asset(s) 230.

In some instances, the computing system can generate the replacement main asset (e.g., replacement main asset 122) based at least in part on expected surroundings of the native content item slot. For instance, the overlay of content elements that produces the publisher-rendered native content item can be obtained and used to determine locations which should not be occupied by logos, business names, interactive user interface elements, or other important features that should be visible.

Additionally, or alternatively, the system can determine one or more safe zones for interactive elements of the content elements utilized to generate the publisher-rendered native content items. For instance, the computing system can determine one or more safe zones within a publisher-rendered native content item with dimension equal to the expected native content slot size. The computing system can populate the one or more safe zones with one or more interactive user interface elements associated with the content elements. For instance, the computing system can determine that a bottom left portion of the user interface will be populated with a title and description that overlay the main asset. In response, the computing system can determine to avoid including an interactive element in that portion of the replacement main asset. The computing system can determine that a middle right portion of the user interface will not contain any items that would obstruct the display of the replacement main asset, in response the computing system can determine that the middle right portion is a safe zone. The computing system can populate the middle right portion with an interactive user interface element (e.g., a link, or other selectable user interface element that can cause the user interface to be updated in response to the computing system obtaining data indicative of user selection of the interactive user interface element.

The main asset generation model can include a generative model. For instance, the generative model can obtain inputs comprising content elements, text input, natural language input, colors, or other input and generate the replacement main asset based on the obtained input. In some implementations, the replacement main asset can be a full-screen main asset. A full-screen main asset can be an asset comprising dimensions indicative of the replacement main asset occupying an entire available user interface display area (e.g., minus padding).

Content provider system 215 can transmit content package 240 to publisher application 210. For instance, content package 240 can include the winning content element or asset group. Content package 240 can include one or more selected content asset(s) 230. The selected content assets can include at least one generated replacement main asset and one or more additional selected content assets (e.g., elements).

In some instances, content package 240 can include a single content item that can be parsed and divided into respective elements (e.g., to be used by a publisher for generating a publisher-rendered native content item).

Content package 240 can be obtained by publisher application 210. Publisher application 210 can render content package 245. Rendering content package can include the publisher application 210 causing client device 205 to present content items 250. For instance, publisher application 210 can organize the items of content package 240 in a manner that results in a publisher-rendered native content item being presented for display via client device 205 in a manner in which the content appears in the same look and feel as other content within the publisher application. For instance, the publisher application can be a social media application that includes a feed of posts. The feed of posts can have a particular format including a profile logo, a main image, a username, or a caption. The publisher application 210 can obtain the replacement main asset and additional content elements from content package 240 and put the elements into a form that aligns with the format including a profile image (e.g., logo), a main asset (e.g., the generated replacement main asset), a username (e.g., company name), a caption (e.g., description about the item), or a call to action (e.g., install now button).

The replacement main asset can be provided in a plurality of formats. For instance, the format can be an HTML5 format. The HTML5 format allows for unique customizations including having a moving or dynamic replacement main asset (e.g., carousel composed of multiple items that cycle through). HTML5 has historically been unavailable for presentation of publisher-rendered native content elements due to the lack of control the content provider device has over the ultimate rendering performed by the publisher. For instance, the publisher could visually transform the asset (e.g., shrink, expand, reduce image quality/resolution, adjust aspect ratio, or otherwise negatively impact the visual appearance) or break the asset. By predicting a predicted size of the content item slot, the computing system can generate a content item in HTML5 to increase the functionality of the content item while decreasing the likelihood that the asset is transformed or otherwise visually broken by the publisher computing device. For instance, by generating a replacement main asset that aligns with the predicted size of the content slot, the replacement main asset should not have to be resized or otherwise transformed in a manner that could negatively impact the visual appearance of the content item. In some instances, the HTML5 asset can include one or more interactive user interface elements.

The client device can obtain interaction data 255. Interaction data can include data indicative of the manner that the content items are presented via client device 205. Interaction data can include raw signal data as described in FIG. 1. Publisher application 210 can transmit interaction data 260 to content provider system 215. Content provider system 215 can use the interaction data 260 to validate the predicted size determined at predict size 225.

Figure 3:
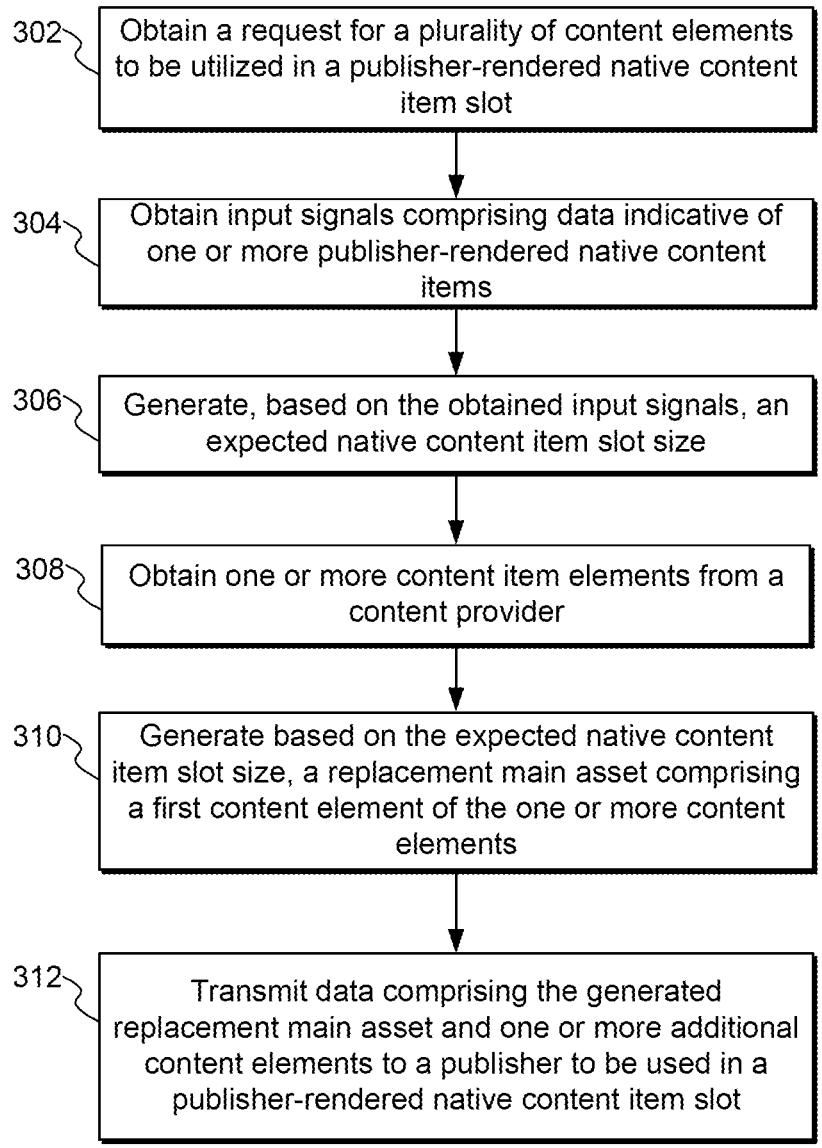
FIG. 3 depicts an example method for size hint prediction and main asset generation for publisher-rendered native content items according to example embodiments of the present disclosure.

FIG. 3 depicts a flow chart diagram of an example method to perform size hint prediction and replacement main asset generation for publisher-rendered native content items according to example embodiments of the present disclosure according to example embodiments of the present disclosure. Although FIG. 3 depicts steps performed in a particular order for purposes of illustration and discussion, the methods of the present disclosure are not limited to the particularly illustrated order or arrangement. The various steps of method 300 can be omitted, rearranged, combined, or adapted in various ways without deviating from the scope of the present disclosure.

At (302), method 300 can include obtaining a request for a plurality of content elements to be utilized in a publisher-rendered native content item slot. For instance, a computing system can obtain a request for a plurality of content elements to be utilized in a publisher-rendered native content item slot.

At (304), method 300 can include obtaining input signals including data indicative of one or more publisher-rendered native content items. For instance, a computing system can obtain input signals including data indicative of one or more publisher-rendered native content items.

At (306), method 300 can include generating, based on the obtained input signals, an expected native content item slot size. For instance, a computing system can generate, based on the obtained input signals, an expected native content item slot size.

Figure 5:
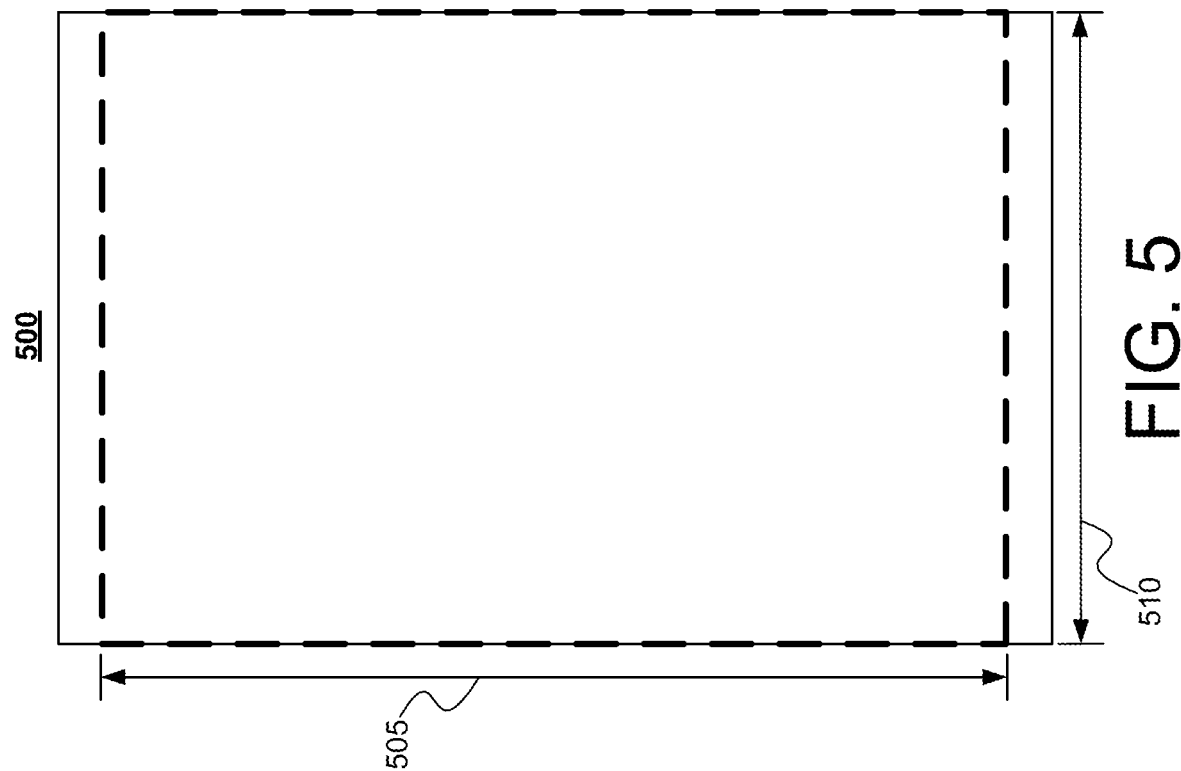
FIG. 5 depicts an example user interface according to example embodiments of the present disclosure.

As described herein, an expected native content slot size can be predicted by the size hint model (e.g., size hint model 137). FIG. 5 depicts example user interface 500. User interface 500 can be associated with a publisher application. The expected native content slot size can include a height dimension 505 and a width dimension 510. In some instances, the expected native content slot size can include a coordinate point that indicates a location of a corner of the content item. In some implementations, the coordinate point can be associated with an edge dimension of user interface 500. While FIG. 5 depicts an example where the expected native content slot size is almost a full screen native content item slot, the native content item can have any size. A size can be associated with a dimension (e.g., in pixels), an aspect ratio (e.g., a ratio of height to width or width to height), a resolution, storage size, or other features.

At (308), method 300 can include obtaining one or more content elements (e.g., content item elements) from a content provider. For instance, a computing system can obtain one or more content elements from a content provider.

In some implementations the content item elements can be stored in a database. For instance, FIG. 4 depicts an example content element database 405. Content element database 405 can include a plurality of asset groups. For instance, the asset groups can include asset group 410A, asset group 410B, asset group 410C, asset group 410D, asset group 410E, or asset group 410F. FIG. 4 also depicts an expanded view 415 of asset group 410D. Each asset group can be associated with a different company, product, advertisement, or other grouping of information. For instance, as depicted in expanded view 415, the asset group 410D can be associated with an application associated with planning travel.

Expanded view 415 can include a plurality of content elements. The content elements can include an icon element 420, a title element 425, a description element 430, a call to action element 435, a company name element 440, a main asset element 445, a star rating element 450, or a downloads element 455. Icon element 420 can include an icon such as a logo associated with the travel company. Title element 425 can include a title, such as "time to travel." Description element 430 can include a string of text that provides additional context to accompany the remaining content elements. Call to action element 435 can include one or more potential call to actions.

For instance, a call to action can include an interactive user interface element that results in installation of an application, clicking a link to visit a website, clicking a link to launching an application, or any other call to action.

Company name element 440 can include the name of a company. For instance, the company's name can be "Company A."

Main asset element 445 can be an asset that has been labeled as a main asset of asset group 410D. For instance, the main asset can be an image, or a generated graphic.

Star rating element 450 can include a star rating associated with the content asset group 410D. For instance, the call to action can be to install an application associated with the travel service provider. The star rating can be a rating that is determined from an application downloading service.

Downloads element 455 can include information about the number of downloads of the application.

At (310), method 300 can include generating, based on the expected native content item slots size, a main asset comprising a first content element of the one or more content elements. For instance, a computing system can generate, based on the expected native content item slot size, a main asset comprising a first content element of the one or more content elements. As described herein, generating the replacement main asset can be performed by a publisher content generator (e.g., publisher-rendered content item generator 120) and can be performed by any method described herein (e.g., as described in FIG. 2 generate one or more replacement main asset(s) 235 and the accompanying description).

Figure 6:
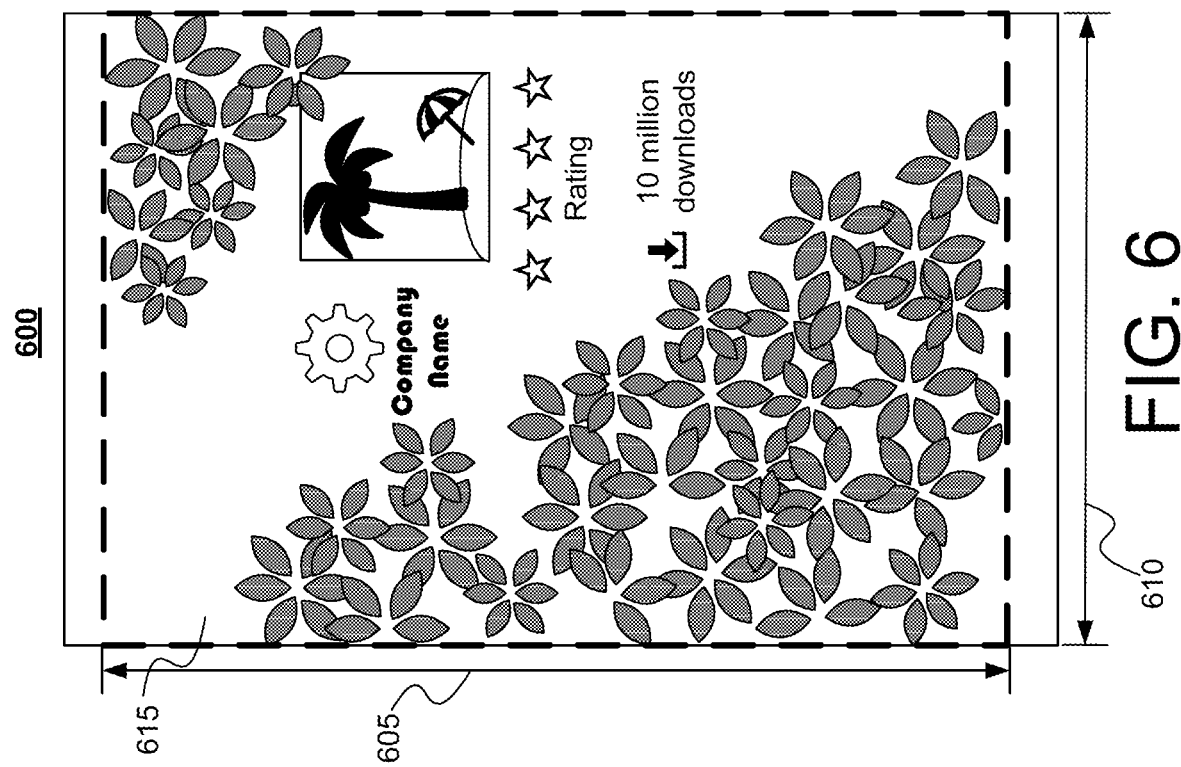
FIG. 6 depicts an example user interface according to example embodiments of the present disclosure.

FIG. 6 depicts an example user interface 600 including a generated replacement main asset 615. replacement main asset 615 can have a height dimension 605 and width dimension 610 that align with those of expected native content item slot (e.g., height dimension 505 and width dimension 510). Replacement main asset 615 can include portions of the main asset element (e.g., main asset element 445) that are obtained from a content element database (e.g., content element database 405). The replacement main asset 615 can include additional content elements obtained from the content element database. For instance, replacement main asset 615 can include a star rating and downloads graphic. Additionally, as depicted in FIG. 6, the computing system can analyze the obtained main asset element (e.g., main asset element 445), parse the element for one or more features, and utilize the features to expand the asset or generate a background for an item that allows the replacement main asset to expand to cover more of the display space while aligning with the look and feel of the publisher application. In some instances, replacement main assets can be generated using a generative model. The generative model can obtain input including one or more content elements and generate the replacement main asset accordingly.

At (312), method 300 can include transmitting data comprising the generated replacement main asset and one or more additional content elements to a publisher to be used in a publisher-rendered native content item slot. For instance, a computing system can transmit data comprising the generated replacement main asset and one or more additional content elements to a publisher to be used in a publisher-rendered native content item slot. As described herein, the replacement main asset can be the generated replacement main asset that was generated based on the expected size of the native content item slot. The one or more additional content elements can include any content element described herein, such as a title, a description, an icon, a rating, a download, or other content elements.

In some implementations, the replacement main asset and the one or more additional content elements can be an asset group that makes up a content package. The content provider computing system can transmit the content page (e.g., content package 240) to the publisher application on the client device to cause the content package to be rendered by the publisher application as a publisher-rendered content item.

Figure 7:
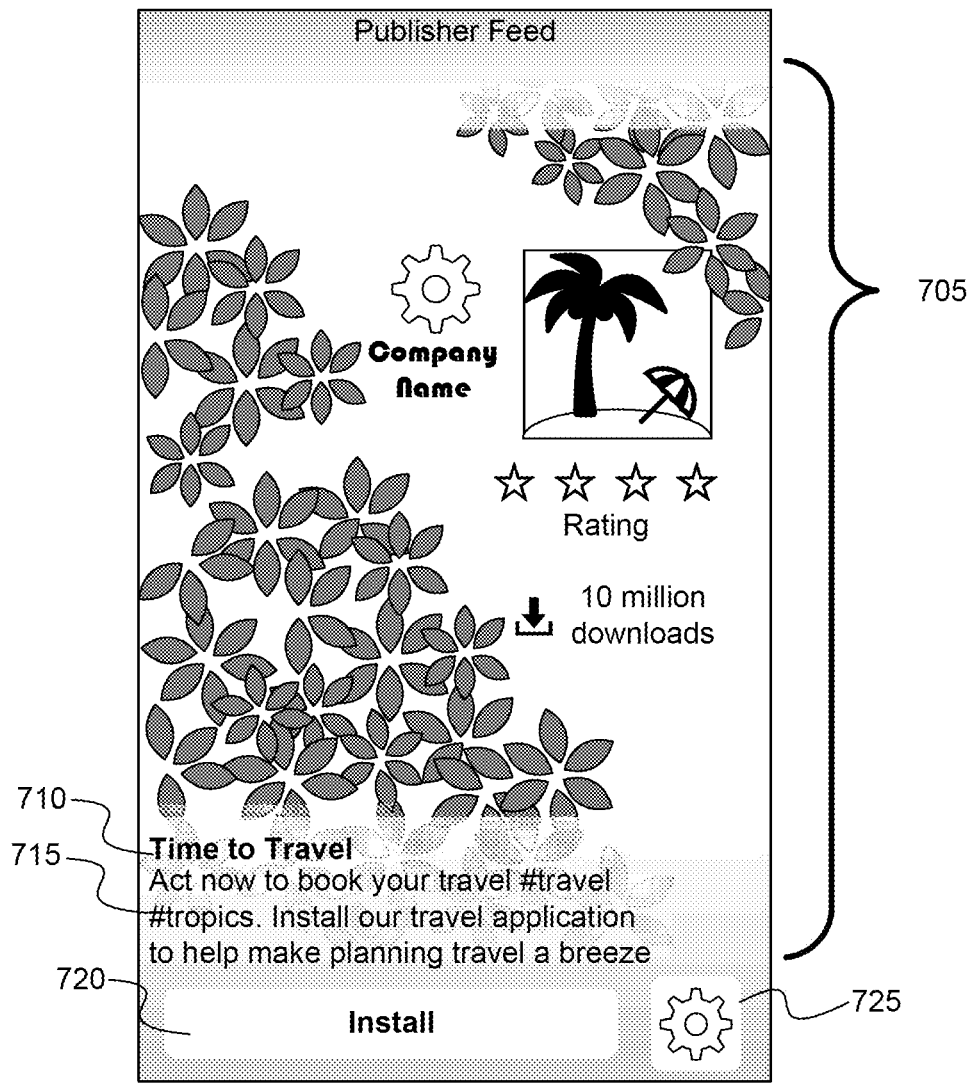
FIG. 7 depicts an example user interface according to example embodiments of the present disclosure.

As described herein, the publisher can generate a native content item out of the generated replacement main asset and one or more additional elements. For instance, FIG. 7 depicts an example user interface 700. User interface 700 can include a publisher-rendered native content item that is provided for display. For instance, the publisher-rendered native content item can be made up of a generated replacement main asset 705, content element 710, content element 715, content element 720, or content element 725. The generated replacement main asset 705 can be combined with other content elements (e.g., content element 710, 715, 720, 725) by the publisher in a manner that matches the look and feel of the publisher application.

The publisher application can generate the layout of the publisher-rendered native content item and cause the publisher-rendered native content item to be provided for display via a user interface of the client device. In some implementations, the publisher application (e.g., and associated SDK) can transmit data comprising one or more characteristics of the publisher-rendered native content item to the content provider for updating the size hint model. As described herein, the content item data can include at least one of the size of a rendered native content item, the layout of the rendered native content item, or an impression/interaction associated with the rendered native content item. The method can include updating the size hint model or validating the predicted publisher-rendered native content item slot size predictions based on the obtained content item data.

Figure 8:
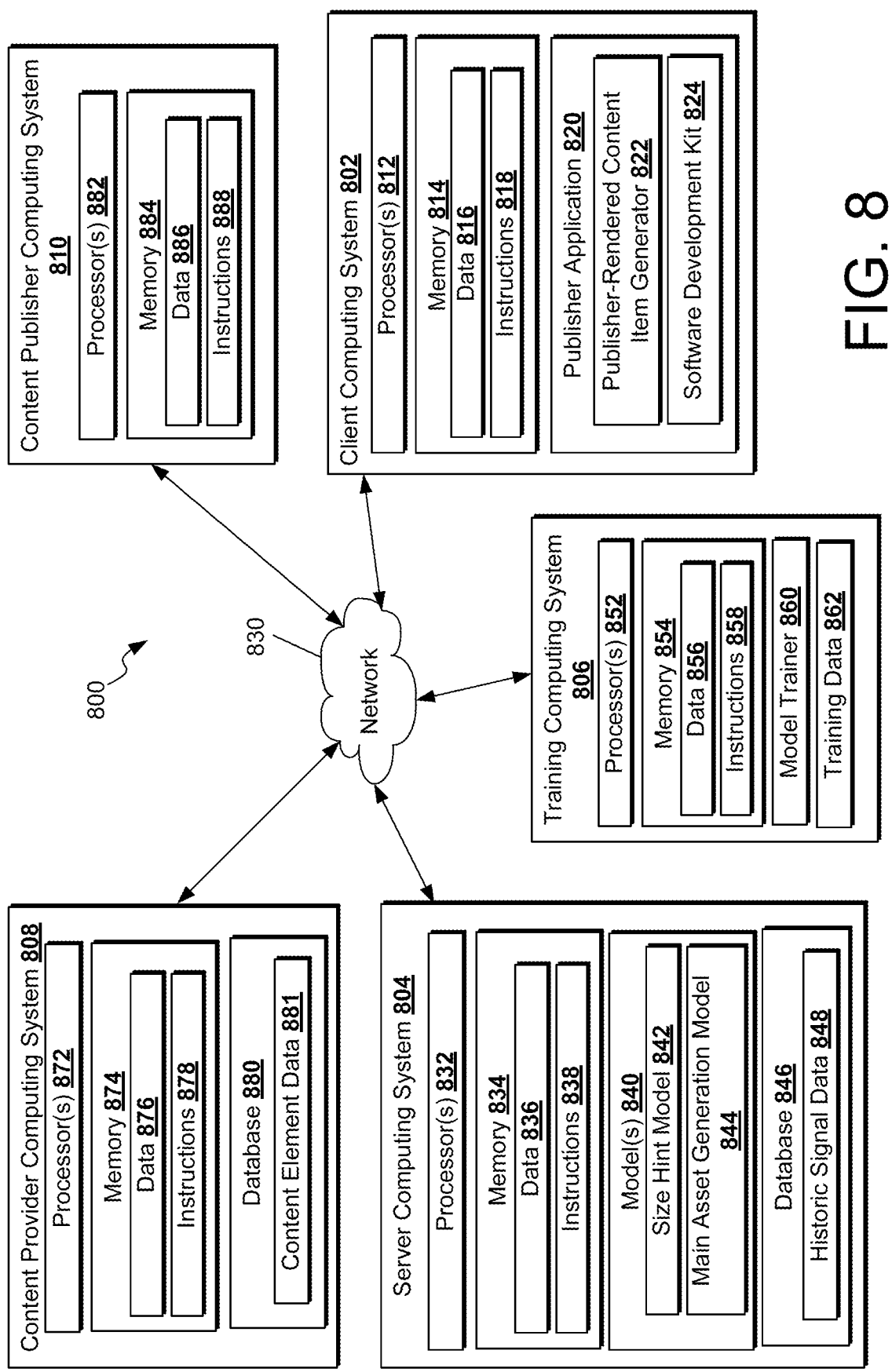
FIG. 8 depicts a block diagram of an example computing system that performs size hint prediction and main asset generation for publisher-rendered native content items according to example embodiments of the present disclosure.

FIG. 8 depicts a block diagram of an example computing system 800 that performs size hint prediction and replacement main asset generation for publisher-rendered native content items according to example embodiments of the present disclosure. The computing system 800 includes a client computing system 802, a server computing system 804, and a training computing system 806, a content provider computing system 808, and a content publisher computing system 810 that are communicatively coupled over a network 830.

The client computing system 802 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The client computing system 802 includes one or more processors 812 and a memory 814. The one or more processors 812 can be any suitable processing device (e.g., a processor core, a microprocessor, an ASIC, an FPGA, a controller, a microcontroller, etc.) and can be one processor or a plurality of processors that are operatively connected. The memory 814 can include one or more non-transitory computer-readable storage media, such as RAM, ROM, EEPROM, EPROM, flash memory devices, magnetic disks, etc., and combinations thereof. The memory 814 can store data 816 and instructions 818 which are executed by the processor 812 to cause the client computing system 802 to perform operations.

In some implementations, the client computing system 802 can include publisher application 820. Publisher application 820 can include an application that is downloaded on a user device. Additionally, or alternatively, publisher application 820 can include a web-based application. Publisher application 820 can include publisher-rendered content item generator 822 or software development kit 824. Publisher-rendered content item generator 822 can obtain content items to generate publisher-rendered native content items. Software development kit 824 can be associated with content provider computing system 808. Software development kit 824 can facilitate obtaining a request for a content element (e.g., asset group), sending the request for content to the server computing system (e.g., associated with one or more content providers), obtaining a content package, or causing the publisher-rendered native content item to render via a user interface of the client computing system 802.

For instance, the software development kit 824 can be integrated into publisher application 820. Software development kit 824 can include content provider generated code that can be executed in the processing space of publisher application 820 (e.g., publisher application 127, publisher application 210). Software development kit 824 can facilitate the publisher application 820 requesting content items to fill publisher-rendered native content item slots. The software development kits can allow for tracking impressions of the publisher-rendered native content items, determine feedback on the publisher-rendered native content items to allow for improvement of the publisher-rendered native content items, and provide for easy scalability.

The server computing system 804 includes one or more processors 832 and a memory 834. The one or more processors 832 can be any suitable processing device (e.g., a processor core, a microprocessor, an ASIC, an FPGA, a controller, a microcontroller, etc.) and can be one processor or a plurality of processors that are operatively connected. The memory 834 can include one or more non-transitory computer-readable storage media, such as RAM, ROM, EEPROM, EPROM, flash memory devices, magnetic disks, etc., and combinations thereof. The memory 834 can store data 836 and instructions 838 which are executed by the processor 832 to cause the server computing system 804 to perform operations.

In some implementations, the server computing system 804 includes or is otherwise implemented by one or more server computing devices. In instances in which the server computing system 804 includes plural server computing devices, such server computing devices can operate according to sequential computing architectures, parallel computing architectures, or some combination thereof.

Server computing system 804 can be configured to obtain data from client computing system 802 (e.g., via software development kit 724 executing via publisher application 820). For instance, server computing system 804 can utilize the obtained data (e.g., raw signals 130) to update or train one or more models 840 (e.g., size hint model 842).

As described above, the server computing system 804 can store or otherwise include one or more models 840. For example, the models 840 can be or can otherwise include various statistical or machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Models 840 can include size hint model 842 and main asset generation model 844. Size hint model 842 can generate a predicted size of the content item slot for a publisher-rendered native content item. Main asset generation model 844 can generate a replacement main asset for a publisher-rendered native content item. Example models 840 are discussed with reference to FIG. 1 and FIG. 2.

Server computing system 804 can include database 846. Database 846 can store historic signal data 848. Historic signal data 848 can include previously acquired signal data associated with previously rendered publisher-rendered native content items.

The content provider computing system 808 includes one or more processors 872 and a memory 874. The one or more processors 872 can be any suitable processing device (e.g., a processor core, a microprocessor, an ASIC, an FPGA, a controller, a microcontroller, etc.) and can be one processor or a plurality of processors that are operatively connected. The memory 874 can include one or more non-transitory computer-readable storage media, such as RAM, ROM, EEPROM, EPROM, flash memory devices, magnetic disks, etc., and combinations thereof. The memory 874 can store data 876 and instructions 878 which are executed by the processor 872 to cause the content provider computing system 808 to perform operations.

In some implementations, the content provider computing system 808 includes or is otherwise implemented by one or more server computing devices. In instances in which the content provider computing system 808 includes plural server computing devices, such server computing devices can operate according to sequential computing architectures, parallel computing architectures, or some combination thereof.

Content provider computing system 808 can include database 880. Database 880 can store content element data 881. Content element data 881 can include content elements, asset groups, or other content related data.

Content provider computing system 808 can be communicatively connected over network 830 to server computing system 804. In some instances, content provider computing system 808 can be a first party computing system associated with the server computing system 804. In some instances, content provider computing system 808 can be associated with a third-party content provider (e.g., advertiser). There can be more than one content provider computing system 808.

The content publisher computing system 810 includes one or more processors 882 and a memory 884. The one or more processors 882 can be any suitable processing device (e.g., a processor core, a microprocessor, an ASIC, an FPGA, a controller, a microcontroller, etc.) and can be one processor or a plurality of processors that are operatively connected. The memory 884 can include one or more non-transitory computer-readable storage media, such as RAM, ROM, EEPROM, EPROM, flash memory devices, magnetic disks, etc., and combinations thereof. The memory 884 can store data 886 and instructions 888 which are executed by the processor 882 to cause the content publisher computing system 810 to perform operations.

In some implementations, the content publisher computing system 810 includes or is otherwise implemented by one or more server computing devices. In instances in which the content publisher computing system 810 includes plural server computing devices, such server computing devices can operate according to sequential computing architectures, parallel computing architectures, or some combination thereof.

The client computing system 802 or the server computing system 804 can train the models 840 via interaction with the training computing system 806 that is communicatively coupled over the network 830. The training computing system 806 can be separate from the server computing system 804 or can be a portion of the server computing system 804.

The training computing system 806 includes one or more processors 852 and a memory 854. The one or more processors 852 can be any suitable processing device (e.g., a processor core, a microprocessor, an ASIC, an FPGA, a controller, a microcontroller, etc.) and can be one processor or a plurality of processors that are operatively connected. The memory 854 can include one or more non-transitory computer-readable storage media, such as RAM, ROM, EEPROM, EPROM, flash memory devices, magnetic disks, etc., and combinations thereof. The memory 854 can store data 856 and instructions 858 which are executed by the processor 852 to cause the training computing system 806 to perform operations. In some implementations, the training computing system 806 includes or is otherwise implemented by one or more server computing devices.

The training computing system 806 can include a model trainer 860 that trains the machine-learned models 840 stored at the client computing system 802 or the server computing system 804 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, or various other loss functions. Gradient descent techniques can be used to iteratively update the parameters over a number of training iterations.

In some implementations, performing backwards propagation of errors can include performing truncated back-propagation through time. The model trainer 860 can perform a number of generalization techniques (e.g., weight decays, dropouts, etc.) to improve the generalization capability of the models being trained.

In particular, the model trainer 860 can train the models 840 based on a set of training data 862. The training data 862 can include, for example, can include historic signal data, publisher-rendered native content item data, user input data, conversion data, user device location data, click data, or other data indicative of a content item being displayed via a user device and the user device performing a target action (e.g., visiting a physical location associated with the respective content item).

In some implementations, if the user has provided consent, the training examples can be provided by the client computing system 802. Thus, in such implementations, the model 840 provided to the client computing system 802 can be trained by the training computing system 806 on user-specific data received from the client computing system 802. In some instances, this process can be referred to as personalizing the model.

The model trainer 860 includes computer logic utilized to provide desired functionality. The model trainer 860 can be implemented in hardware, firmware, or software controlling a general purpose processor. For example, in some implementations, the model trainer 860 includes program files stored on a storage device, loaded into a memory and executed by one or more processors. In other implementations, the model trainer 860 includes one or more sets of computer-executable instructions that are stored in a tangible computer-readable storage medium such as RAM, hard disk, or optical or magnetic media.

The network 830 can be any type of communications network, such as a local area network (e.g., intranet), wide area network (e.g., Internet), or some combination thereof and can include any number of wired or wireless links. In general, communication over the network 830 can be carried via any type of wired or wireless connection, using a wide variety of communication protocols (e.g., TCP/IP. HTTP. SMTP, FTP), encodings or formats (e.g., HTML, XML), or protection schemes (e.g., VPN, secure HTTP, SSL).

The machine-learned models described in this specification may be used in a variety of tasks, applications, or use cases.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be statistical data. Statistical data can be, represent, or otherwise include data computed or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some cases, the input includes visual data, and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 8 illustrates one example computing system that can be used to implement the present disclosure. Other computing systems can be used as well. For example, in some implementations, the client computing system 802 can include the model trainer 860 and the training data 862. In such implementations, the models 840 can be both trained and used locally at the client computing system 802. In some of such implementations, the client computing system 802 can implement the model trainer 860 to personalize the models 840 based on user-specific data.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

The depicted or described steps are merely illustrative and can be omitted, combined, or performed in an order other than that depicted or described; the numbering of depicted steps is merely for ease of reference and does not imply any particular ordering is necessary or preferred.

The functions or steps described herein can be embodied in computer-usable data or computer-executable instructions, executed by one or more computers or other devices to perform one or more functions described herein. Generally, such data or instructions include routines, programs, objects, components, data structures, or the like that perform particular tasks or implement particular data types when executed by one or more processors in a computer or other data-processing device. The computer-executable instructions can be stored on a computer-readable medium such as a hard disk, optical disk, removable storage media, solid-state memory, read-only memory (ROM), random-access memory (RAM), or the like. As will be appreciated, the functionality of such instructions can be combined or distributed as desired. In addition, the functionality can be embodied in whole or in part in firmware or hardware equivalents, such as integrated circuits, application-specific integrated circuits (ASICs), field-programmable gate arrays (FPGAs), or the like. Particular data structures can be used to implement one or more aspects of the disclosure more effectively, and such data structures are contemplated to be within the scope of computer-executable instructions or computer-usable data described herein.

Although not required, one of ordinary skill in the art will appreciate that various aspects described herein can be embodied as a method, system, apparatus, or one or more computer-readable media storing computer-executable instructions. Accordingly, aspects can take the form of an entirely hardware embodiment, an entirely software embodiment, an entirely firmware embodiment, or an embodiment combining software, hardware, or firmware aspects in any combination.

As described herein, the various methods and acts can be operative across one or more computing devices or networks. The functionality can be distributed in any manner or can be located in a single computing device (e.g., server, client computer, user device, or the like).

Aspects of the disclosure have been described in terms of illustrative embodiments thereof. Numerous other embodiments, modifications, or variations within the scope and spirit of the appended claims can occur to persons of ordinary skill in the art from a review of this disclosure. For example, one or ordinary skill in the art can appreciate that the steps depicted or described can be performed in other than the recited order or that one or more illustrated steps can be optional or combined. Any and all features in the following claims can be combined or rearranged in any way possible.

Aspects of the disclosure have been described in terms of illustrative embodiments thereof. Numerous other embodiments, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, or equivalents to such embodiments. Accordingly, the subject disclosure does not preclude inclusion of such modifications, variations, or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, or equivalents.

What is claimed is:

1. A computer-implemented method, comprising:
   obtaining, from a client device, by a content provider computing system, a request for a plurality of content elements to be utilized in a publisher-rendered native content item slot;
   obtaining, by the content provider computing system, input signals comprising data indicative of one or more publisher-rendered native content items;
   generating, by a model associated with the content provider computing system, based on the input signals, an expected native content item slot size;
   obtaining, by the content provider computing system, one or more content item elements from a content provider;
   generating, by the content provider computing system, based on the expected native content item slot size, a replacement main asset comprising a first content element of the one or more content elements by:
      obtaining, by a content generation component, the one or more content item elements;
      determining, by the content generation component, a main content item element;
      determining, based on the expected native content item slot size and a size of the main content item element, an expected area of negative space around the main content element to reach an entire area associated with the expected native content item slot size; and
      generating, based on the main content element, replacement main asset comprising the main content element and one or more generated content elements, wherein the replacement main asset satisfies a size threshold or a resolution threshold; and
   transmitting, by the content provider computing system, data comprising the replacement main asset and one or more additional content elements to a publisher to be used in a publisher-rendered native content item slot.

2. The computer-implemented method of claim 1, comprising:
   obtaining, by the content provider computing system, content item data indicative of a publisher-rendered native content item, wherein the content item data comprises at least one of a size of a rendered native content item, a layout of the rendered native content item, or an impression associated with the rendered native content item; and
   updating, by the content provider computing system, the model to predict the expected native content item slot size based on the obtained content item data.

3. The computer-implemented method of claim 1, wherein the publisher-rendered native content item is provided for display via the publisher-rendered native content item slot via a user interface associated with an application of the publisher.

4. The computer-implemented method of claim 1, wherein the replacement main asset is generated based at least in part on one or more features associated with the publisher, wherein the features comprise at least one of colors, font, style, image, or logo.

5. The computer-implemented method of claim 1, wherein the replacement main asset comprises an HTML5 asset.

6. The computer-implemented method of claim 1, wherein the model comprises a statistical model.

7. The computer-implemented method of claim 1, wherein the model comprises a machine learned model.

8. The computer-implemented method of claim 1, wherein the expected native content item slot size comprises a position, a width, or a height.

9. A computing system, comprising:
one or more processors; and
one or more one or more non-transitory computer-readable media storing instructions that are executable to cause the one or more processors to perform operations, the operations comprising:
 obtaining, from a client device, by a content provider computing system, a request for a plurality of content elements to be utilized in a publisher-rendered native content item slot;
 obtaining, by the content provider computing system, input signals comprising data indicative of one or more publisher-rendered native content items;
 generating, by a model associated with the content provider computing system, based on the input signals, an expected native content item slot size;
 obtaining, by the content provider computing system, one or more content item elements from a content provider;
 generating, by the content provider computing system, based on the expected native content item slot size, a replacement main asset comprising a first content element of the one or more content elements by:
  determining one or more safe zones within a publisher-rendered native content item with dimensions equal to the expected native content slot size; and
  populating the one or more safe zones with one or more interactive user interface elements associated with the content elements; and
 transmitting, by the content provider computing system, data comprising the replacement main asset and one or more additional content elements to a publisher to be used in a publisher-rendered native content item slot.

10. The computing system of claim 9, wherein the publisher-rendered native content item slot is within a publisher application, wherein the publisher application comprises a software development kit (SDK) associated with the content provider computing system for generating a request for one or more content elements and rendering the replacement main asset and the one or more additional content elements via the publisher-rendered native content item slot.

11. The computing system of claim 9, wherein generating the replacement main asset comprising the first content element of the one or more content elements comprises:
 generating, using a generative model, the replacement main asset.

12. The computing system of claim 9, wherein the replacement main asset comprises a full-screen main asset.

13. The computing system of claim 9, wherein the client device comprises a walled garden environment, wherein the publisher-rendered native content item slot is inside the walled garden.

14. The computing system of claim 13, wherein the publisher-rendered native content item comprises one or more interactive user interface elements, the operations comprising:
 obtaining interaction data indicative of a user selection of a first interactive user interface element of the one or more interactive user interface elements;
 generating a first raw data signal comprising the interaction data; and
 storing the first raw data signal comprising the interaction data.

15. The computing system of claim 9, the operations comprising:
 obtaining, by the content provider computing system, content item data indicative of a publisher-rendered native content item, wherein the content item data comprises a size of a rendered native content item;
 comparing the data indicative of the publisher-rendered native content item to an expected native content item slot size; and
 updating the model associated with the content provider computing system based on comparing the data indicative of the publisher-rendered native content item to the expected native content item slot size.

16. The computing system of claim 9, wherein the replacement main asset comprises an HTML5 asset, wherein the HTML5 asset comprises one or more interactive user interface elements.

17. One or more non-transitory computer readable media storing instructions that are executable by one or more processors to perform operations comprising:
 obtaining, from a client device, by a content provider computing system, a request for a plurality of content elements to be utilized in a publisher-rendered native content item slot;
 obtaining, by the content provider computing system, input signals comprising data indicative of one or more publisher-rendered native content items;
 generating, by a model associated with the content provider computing system, based on the input signals, an expected native content item slot size by:
  obtaining, by the content provider computing system, content item data indicative of one or more publisher-rendered native content items, wherein the content item data comprises at least one of a size of a rendered native content item, a layout of the rendered native content item, or an impression associated with the rendered native content item; and
  generating, by the model associated with the content provider computing system, the expected native content item slot size;
 obtaining, by the content provider computing system, one or more content item elements from a content provider;
 generating, by the content provider computing system, based on the expected native content item slot size, a replacement main asset comprising a first content element of the one or more content elements; and
 transmitting, by the content provider computing system, data comprising the replacement main asset and one or more additional content elements to a publisher to be used in a publisher-rendered native content item slot.

* * * * *